United States Patent
Pannala

(10) Patent No.: US 7,827,515 B2
(45) Date of Patent: Nov. 2, 2010

(54) PACKAGE DESIGNS FOR FULLY FUNCTIONAL AND PARTIALLY FUNCTIONAL CHIPS

(75) Inventor: Sreemala Pannala, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 588 days.

(21) Appl. No.: 11/724,395

(22) Filed: Mar. 15, 2007

(65) Prior Publication Data

US 2008/0229064 A1 Sep. 18, 2008

(51) Int. Cl.
G06F 17/50 (2006.01)
G06F 11/00 (2006.01)
H03K 17/693 (2006.01)

(52) U.S. Cl. .......... 716/15; 716/1; 716/2; 716/11; 716/14; 714/10; 714/25; 714/36; 714/741; 714/742

(58) Field of Classification Search .......... 716/1, 716/15, 18; 714/10, 36, 741; 712/19.39; 324/765
See application file for complete search history.

(56) References Cited

U.S. PATENT DOCUMENTS

| | | | | |
|---|---|---|---|---|
| 5,331,591 A | * | 7/1994 | Clifton | 365/182 |
| 5,937,202 A | * | 8/1999 | Crosetto | 712/19 |
| 6,028,365 A | * | 2/2000 | Akram et al. | 257/778 |
| 6,081,463 A | * | 6/2000 | Shaffer et al. | 365/200 |
| 6,728,862 B1 | * | 4/2004 | Wilson | 712/14 |
| 6,894,513 B2 | * | 5/2005 | Sen et al. | 324/719 |
| 6,898,580 B1 | * | 5/2005 | Curran et al. | 705/400 |
| 7,017,074 B2 | * | 3/2006 | Okin | 714/11 |
| 7,155,370 B2 | * | 12/2006 | Nejedlo | 702/186 |
| 7,171,542 B1 | * | 1/2007 | Alfano et al. | 712/38 |
| 7,194,600 B2 | * | 3/2007 | Douglass et al. | 712/37 |
| 7,299,377 B2 | * | 11/2007 | Norman | 714/10 |
| 7,328,371 B1 | * | 2/2008 | Kalyanasundharam et al. | 714/11 |
| 7,336,095 B2 | * | 2/2008 | Erickson et al. | 326/8 |
| 7,401,165 B2 | * | 7/2008 | Nishimoto et al. | 710/14 |
| 7,484,153 B2 | * | 1/2009 | Kiryu et al. | 714/733 |
| 7,519,866 B2 | * | 4/2009 | Crowell et al. | 714/36 |
| 2005/0071719 A1 | * | 3/2005 | Faust et al. | 714/741 |
| 2006/0036831 A1 | * | 2/2006 | Karashima et al. | 711/206 |
| 2007/0260823 A1 | * | 11/2007 | Dickinson et al. | 711/153 |
| 2008/0320331 A1 | * | 12/2008 | Nakatani et al. | 714/35 |
| 2009/0193652 A1 | * | 8/2009 | Salmon | 29/831 |

* cited by examiner

Primary Examiner—Helen Rossoshek
(74) Attorney, Agent, or Firm—Osha Liang LLP

(57) ABSTRACT

A method including obtaining an operational status of a first processor core, where the first processor core is associated with a plurality of processor cores located on a chip; configuring a first IO block of a package design based on the operational status of the first processor core, where the package design is based on a fully functional chip; and configuring a stackup of the package design after configuring the first IO block for use with the chip.

2 Claims, 7 Drawing Sheets

US 7,827,515 B2

PACKAGE DESIGNS FOR FULLY FUNCTIONAL AND PARTIALLY FUNCTIONAL CHIPS

BACKGROUND

A printed circuit board may contain any number of chips. Instead of connecting and mounting a chip directly to a printed circuit board, typically, a chip is placed into a package. Then, the package is connected to a printed circuit board. In a socket mount, the package is plugged into the printed circuit board. In a surface mount, the package is soldered onto the printed circuit board. Designing a chip package is neither a trivial, nor inexpensive task. Therefore, chip package designs are often complicated and made for specific fully functional chips. Accordingly, if a chip includes any regions that are not operational, this could cause the entire printed circuit board not to operate properly.

SUMMARY

In general, in one aspect, the invention relates to a method. The method comprising: obtaining an operational status of a first processor core, wherein the first processor core is associated with a plurality of processor cores located on a chip; configuring a first IO block of a package design based on the operational status of the first processor core, wherein the package design is based on a fully functional chip; and configuring a stackup of the package design after configuring the first IO block for use with the chip.

In general, in one aspect, the invention relates to a chip package. The chip package comprising: a power block for distributing power to a partially functional chip comprising a plurality of core processors; a first IO block for establishing IO connections to the chip; and a package stackup based on the first IO block and the power block, wherein the first IO block is configured based on an operational status of a first core processor of the plurality of core processors, and wherein a design of the chip package was associated with a fully functional chip prior to configuration of the first IO block.

In general, in one aspect, the invention relates to an apparatus. The apparatus comprising: means for obtaining an operational status of a first processor core, wherein the first processor core is associated with a plurality of processor cores located on a chip; means for configuring a first IO block of a package design based on the operational status of the first processor core, wherein the package design is based on a fully functional chip; and means for configuring a stackup of the package design after configuring the first IO block for use with the chip.

Other aspects of the invention will be apparent from the following description and the appended claims.

DETAILED DESCRIPTION

Figure 1:
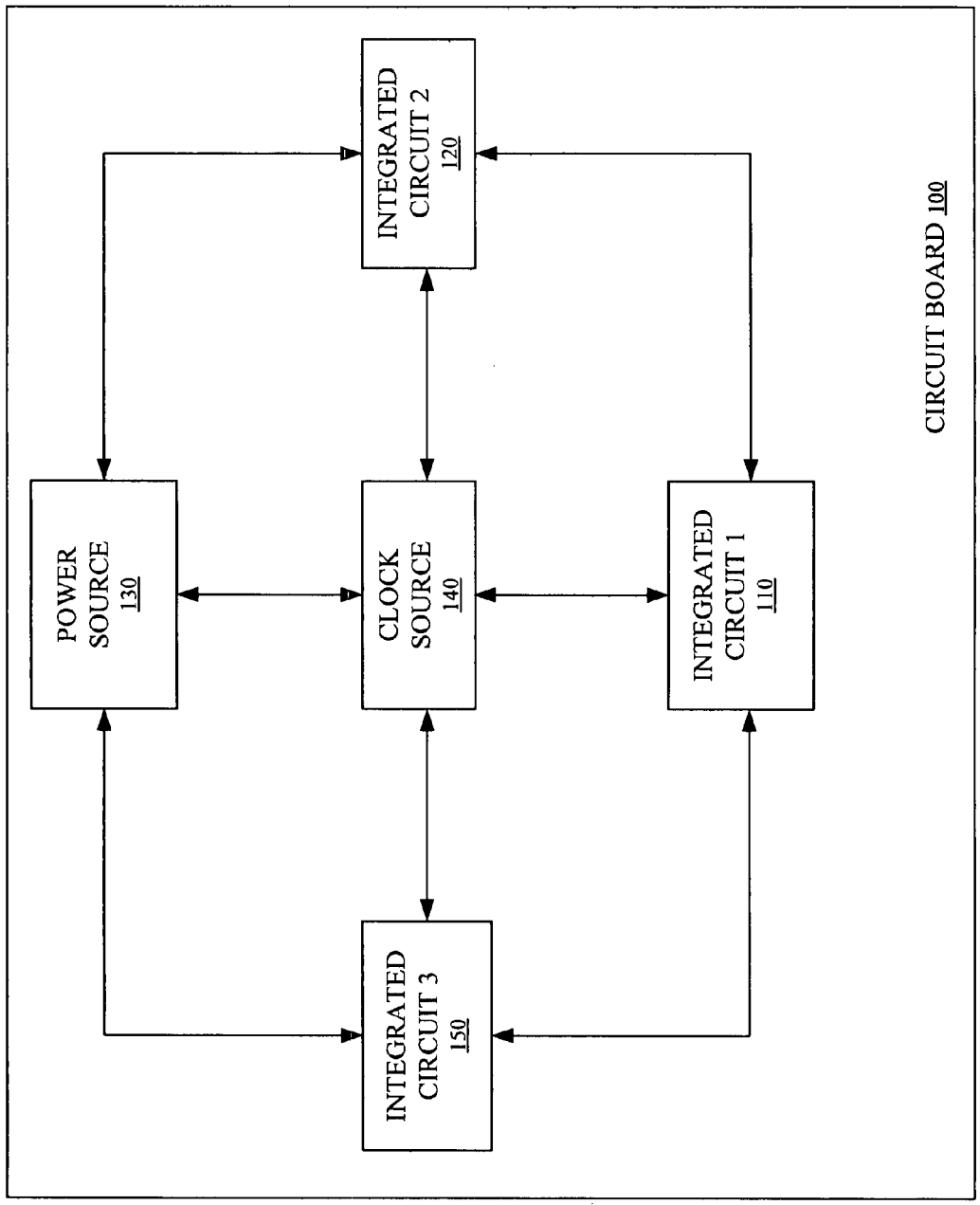
FIG. 1 shows a circuit board in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for modifying a fully functional chip package design for use with a partially functional chip by configuring IO blocks and the stackup of the package design. In general, embodiments of the invention provide a package for a partially functional chip, where the design of the package is associated with a fully functional chip.

FIG. 1 shows a circuit board (100) in accordance with one or more embodiments of the invention. As shown in FIG. 1, the circuit board (100) has multiple components including one or more integrated circuits (i.e., Integrated Circuit 1 (110), Integrated Circuit 2 (120), Integrated Circuit 3 (150)), a power source (130), and a clock source (140). The area of the circuit board (100) occupied by a component may be referred to as the footprint of the component.

In one or more embodiments of the invention, the multiple integrated circuits (110, 120, 150), the power source (130), and the clock source (140) are manufactured separately from the circuit board (100). Each of the components may include pins for mounting and connecting the component to the circuit board (100) (e.g., by soldering). In one or more embodiments of the invention, traces (e.g., copper traces) may be printed on either side of the circuit board (100) to connect the multiple components to each other.

Figure 2:
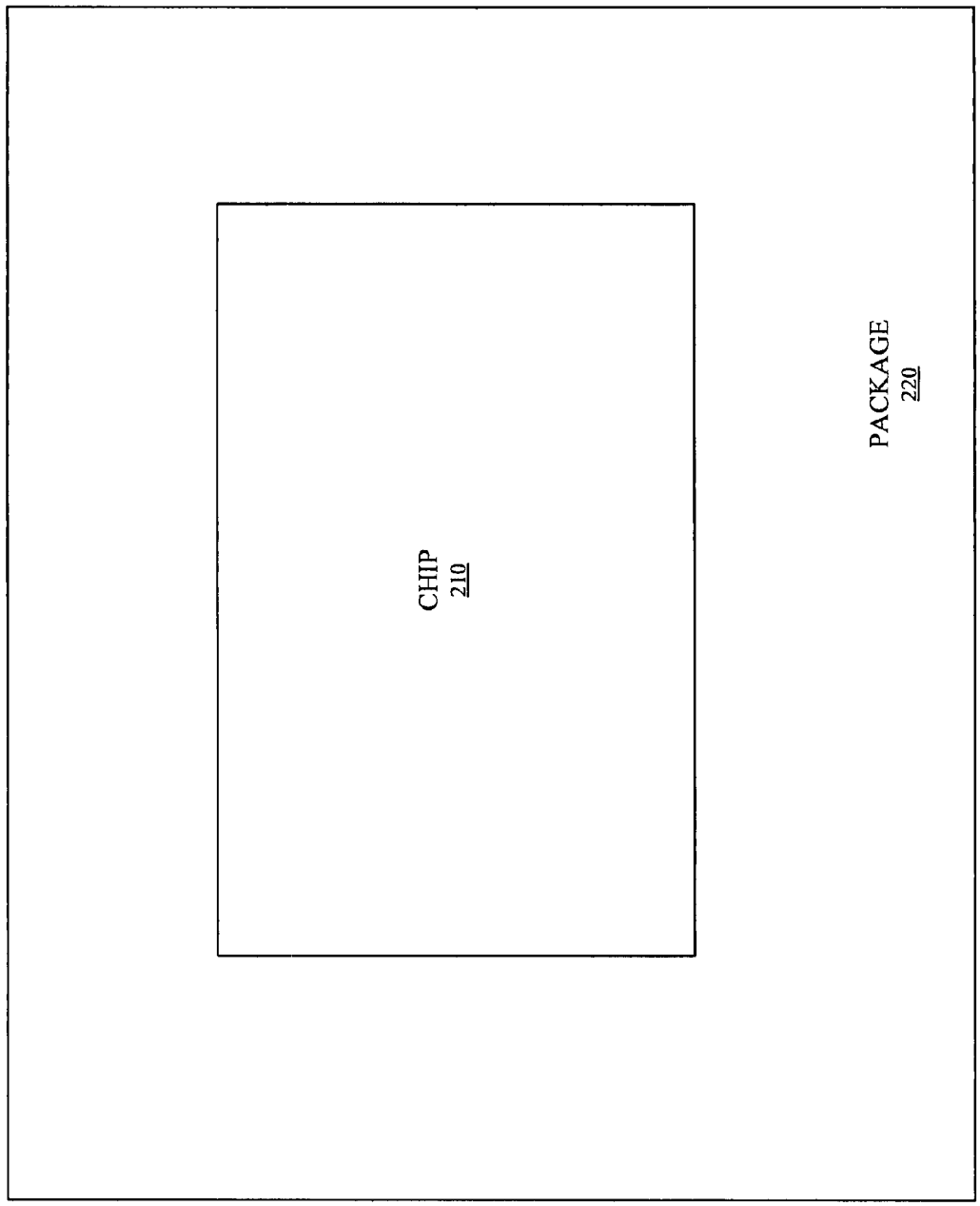
FIGS. 2 and 3 show integrated circuits in accordance with one or more embodiments of the invention.

FIG. 2 shows an integrated circuit (200) in accordance with one or more embodiments of the invention. The integrated circuit (200) may be essentially the same as the integrated circuits (110, 120, 150) discussed above in reference to FIG. 1. The integrated circuit (200) may include a chip (210) and a package (220).

In one or more embodiments of the invention, the chip (210) includes N core processors (e.g., N>1) (not shown). Although the chip (210) may be designed with N core processors, one or more of the N core processors may not be operational after manufacturing the chip. The one or more of the N core processors may not be operational because of manufacturing defects and/or material defects.

When a manufactured core processor is inoperative, the operational status of the core processor may be referred to as defective. In contrast, when a manufactured core processor is operative, the operational status of the core processor may be referred to as active. In one or more embodiments of the invention, when the manufactured N core processors are all active, the chip (210) may be referred to as a fully functional chip. In one or more embodiments of the invention, when at least one of the N core processors is defective, the chip (210) may be referred to as a partially functional chip.

In one or more embodiments of the invention, the package (220) includes one or more IO blocks (not shown) for establishing input/output (IO) connections between the chip (210) and a circuit board designed for use with the chip (210) (e.g., circuit board (100) discussed above in reference to FIG. 1). Those skilled in the art, having the benefit of this detailed description, will appreciate the design of the package (220) must specify many factors including the location and configuration of the one or more IO blocks. The location and configuration of the one or more IO blocks may in turn require the package (220) to have multiple layers to effectively establish the IO connections between the chip (210) and the circuit board. The multiple layers of the package (220) may be referred to as the stackup of the package (220).

In one or more embodiments of the invention, the design of package (220) includes one or more power blocks (not shown) for distributing power to the chip (210) from a circuit board. The one or more power blocks (not shown) may also require the package (220) have multiple layers to effectively distribute power to the chip (210).

Figure 3:
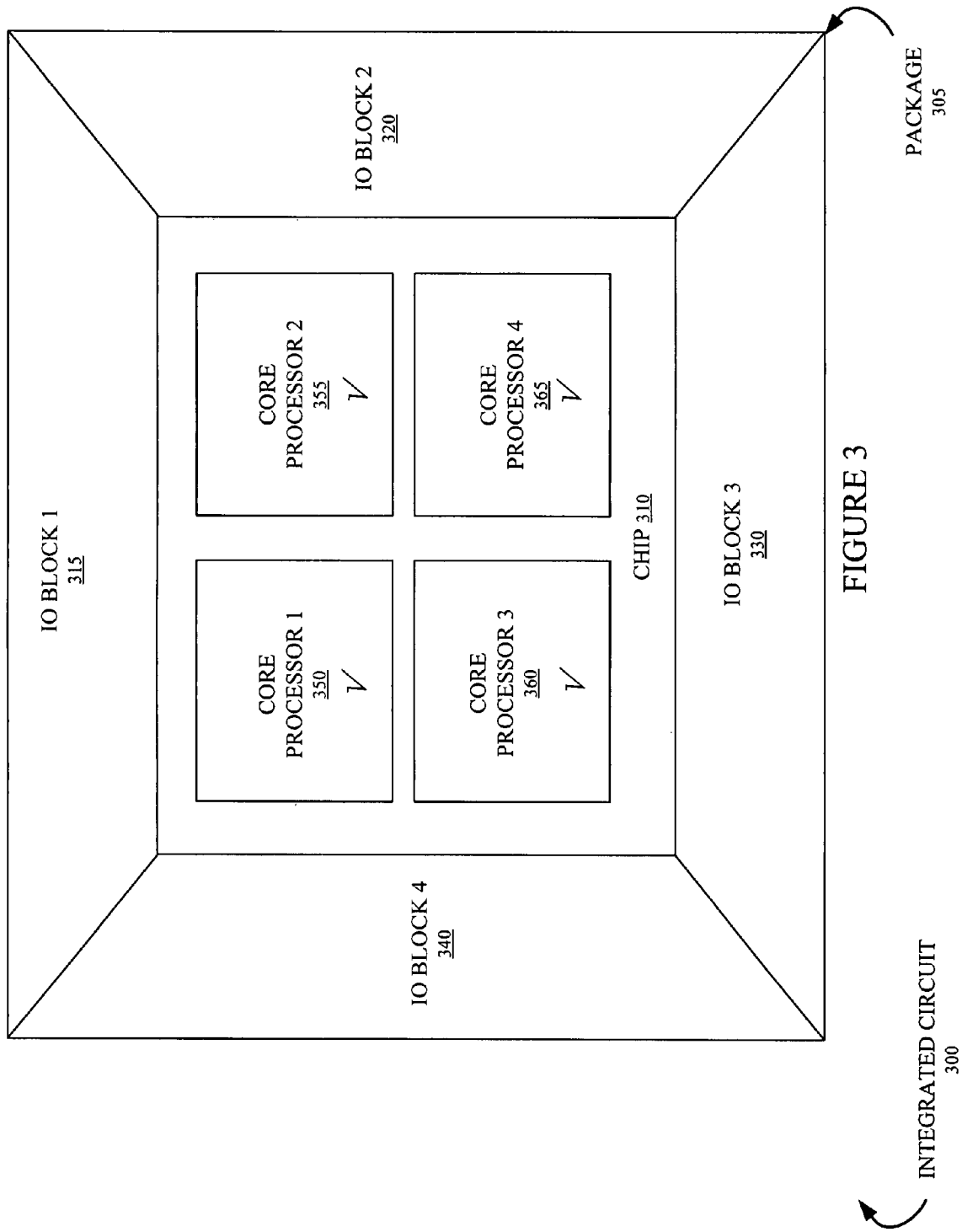

FIG. 3 shows an integrated circuit (300) in accordance with one or more embodiments of the invention. The integrated circuit (300) may be essentially the same as the integrated circuit (200), discussed above in reference to FIG. 2. As shown in FIG. 3, the integrated circuit (300) includes a chip (310) with multiple core processors (i.e., Core Processor 1 (350), Core Processor 2 (355), Core Processor 3 (360), Core Processor 4 (365)). The chip (310) may be essentially the same as chip (210), discussed above in reference to FIG. 2. The integrated circuit (300) also includes a package (305) with multiple IO blocks (i.e., IO block 1 (315), IO block 2 (320), IO block 3 (330), IO block 4 (340)). The package (305) may be essentially the same as package (220) discussed above in reference to FIG. 2. In one or more embodiments of the invention, the IO blocks (315, 320, 330, 340) form the perimeter of the package (305). In other words, each of the IO blocks is located along a periphery of the package (305).

Still referring to FIG. 3, defective core processors are denoted with an 'X' symbol. In contrast, active core processors are denoted with a '√' symbol. As shown in FIG. 3, all of the core processors (350, 355, 360, 365) are active. In other words, there are no defective core processors associated with the chip (310). Accordingly, the chip (310) is a fully functional chip.

As discussed above, the one or more IO blocks (315, 320, 330, 340) are used for establishing IO connections between the chip (310) and a circuit board designed for use with the chip (310). As also discussed above, the design of the package (305) may specify many factors including the location and configuration of the one or more IO blocks (315, 320, 330, 340).

Figure 4:
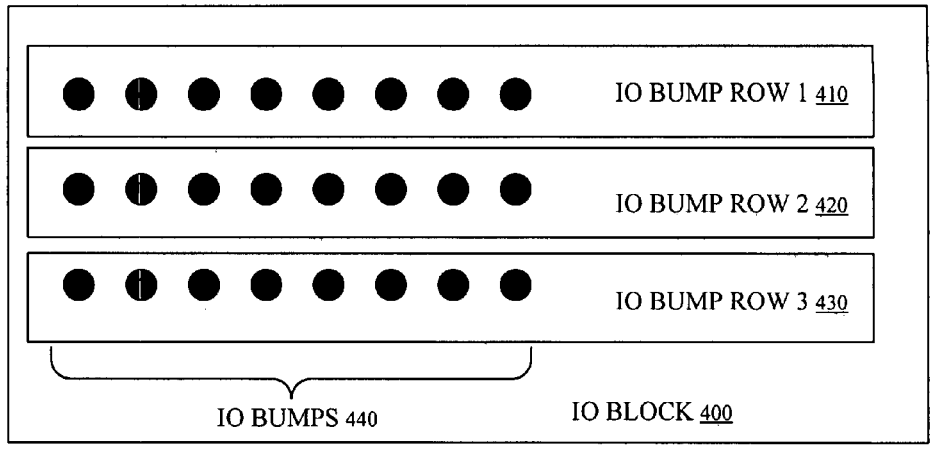
FIG. 4 shows an IO block in accordance with one or more embodiments of the invention.

FIG. 4 shows an IO block (400) in accordance with one or more embodiments of the invention. The IO block (400) may be essentially the same as the IO blocks (315, 320, 330, 340) discussed above in reference to FIG. 3. As shown in FIG. 4, the IO block (400) may include multiple IO Bumps (440). The multiple IO Bumps (440) may be organized in one or more rows (i.e., IO Bump Row 1 (410), IO Bump Row 2 (420), IO Bump Row 3 (430)).

In one or more embodiments of the invention, the IO block (400) is configured so each of the IO bumps (440) is mapped to a pin of the package (305) (discussed above in reference to FIG. 3). Similarly, the IO block (400) may be configured so each of the IO bumps (440) is mapped to a core processor of the chip (310) for establishing an IO connection between the core processor and a circuit board. In one or more embodiments of the invention, all of the IO bumps (440) of the IO block (400) are required to connect a fully functional chip (e.g., chip (310)) with a circuit board. As discussed above, the configuration of the IO block (400) (i.e., the mapping of the IO bumps (440)) may require the package including the IO block (400) to have multiple layers (i.e., a stackup).

Figure 5:
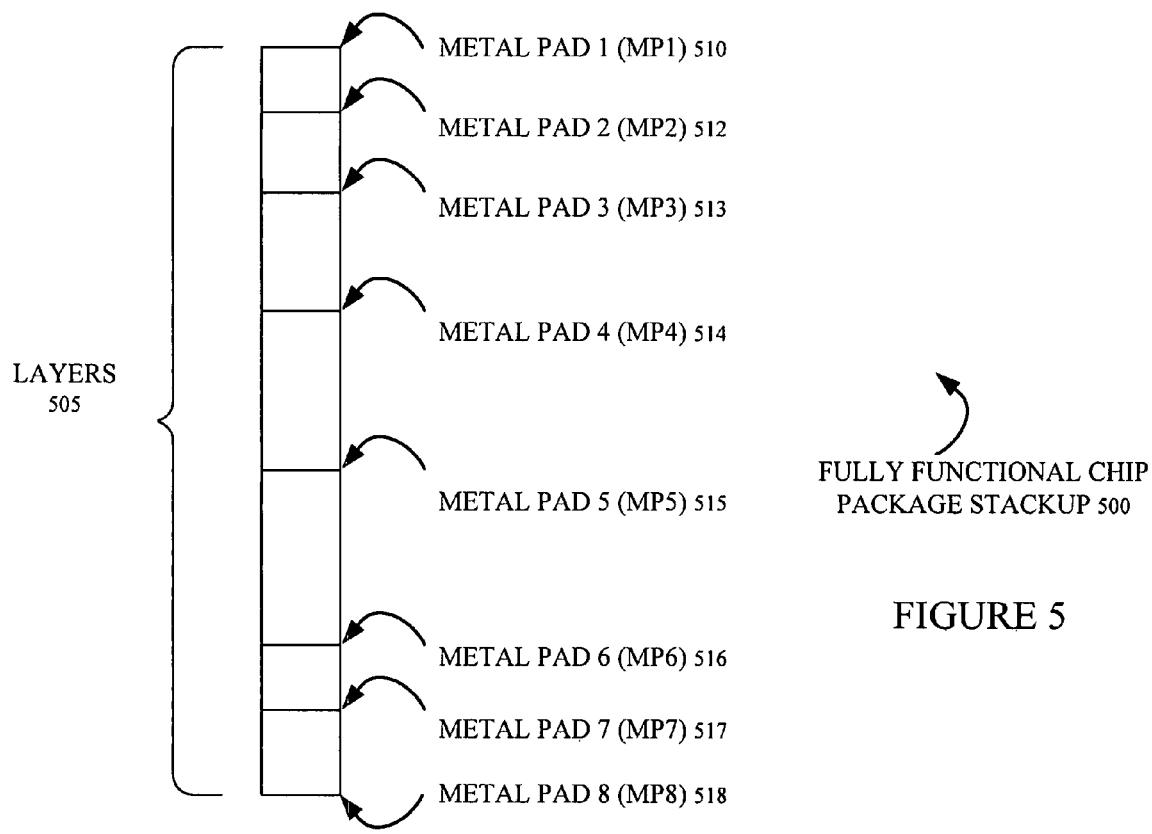
FIG. 5 shows a fully functional chip package stackup in accordance with one or more embodiments of the invention.

FIG. 5 shows a stackup (500) in a package design for a fully functional chip in accordance with one or more embodiments of the invention. The fully functional chip package stackup (500) may be the result of configuring an IO block as shown and discussed above in reference to FIG. 4. As shown in FIG. 5, the fully functional chip package stackup (500) includes multiple layers (505). The design of each layer may include a metal pad (MP) (i.e., MP1 (510), MP2 (512), MP3 (513), MP4 (514), MP5 (515), MP6 (516), MP7 (517), MP8 (518)). One or more of the layers (505) may be associated with power distribution to the core processors (i.e., $V_{CC}$, $V_{SS}$, $V_{DD}$, VDDIO, etc.). One or more of the layers (505) may be used for establishing IO connections between a core processor and the circuit board. The layer associated with MP1 (510) may be referred to as the top of the fully functional chip package stackup (500). The layers associated with MP8 (518) may be referred to as the bottom of the stackup.

Figure 6:
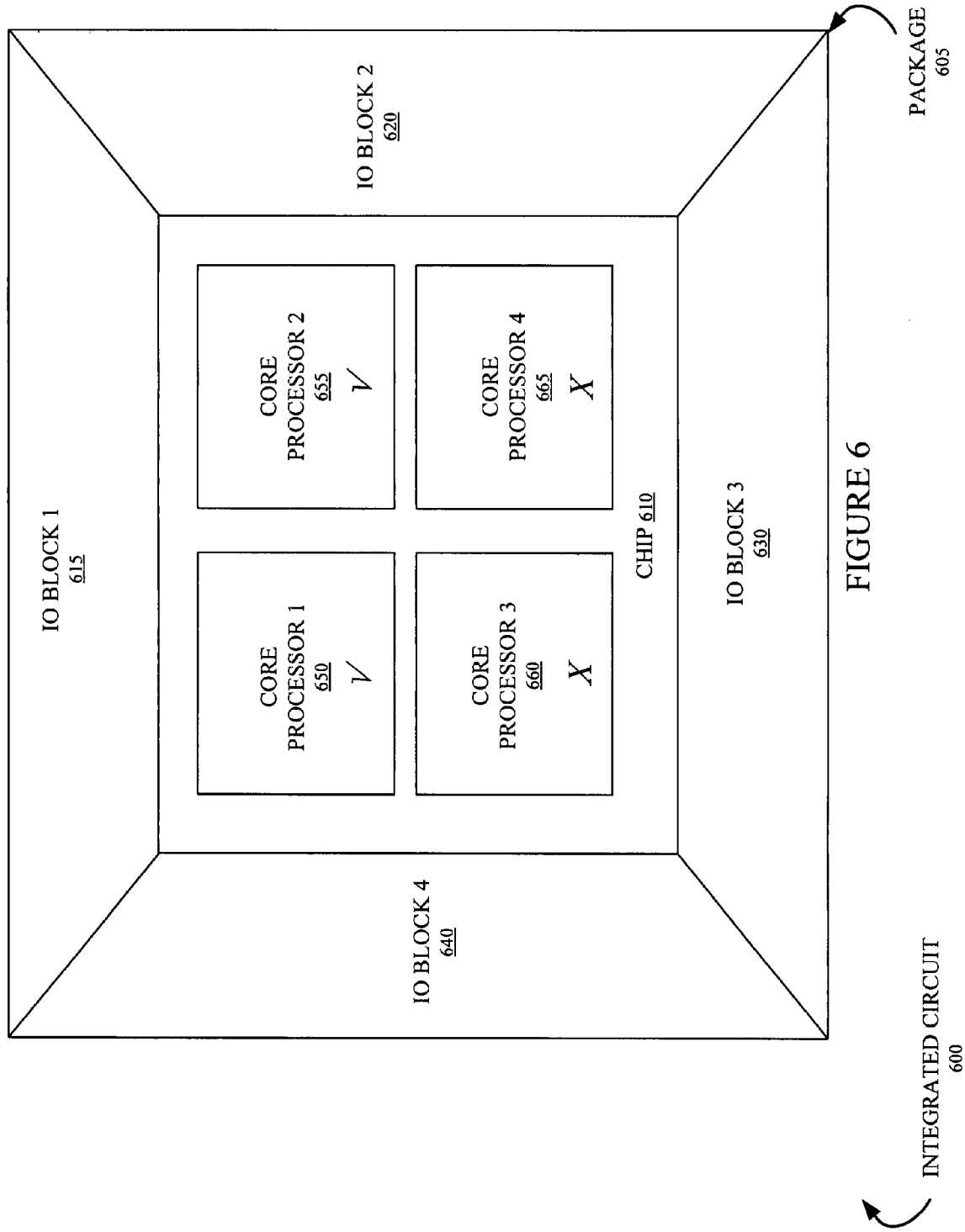
FIG. 6 shows an integrated circuit in accordance with one or more embodiment of the invention.

FIG. 6 shows an integrated circuit (600) in accordance with one or more embodiments of the invention. The integrated circuit (600) may be essentially the same as the integrated circuit (200), discussed above in reference to FIG. 2. As shown in FIG. 6, the integrated circuit (600) includes a chip (610) with multiple core processors (i.e., Core Processor 1 (650), Core Processor 2 (655), Core Processor 3 (660), Core Processor 4 (665)). The chip (610) may be essentially the same as chip (210), discussed above in reference to FIG. 2. The integrated circuit (600) also includes a package (605) with multiple IO blocks (i.e., IO block 1 (615), IO block 2 (620), IO block 3 (630), IO block 4 (640)). The package (605) may be essentially the same as package (220) discussed above in reference to FIG. 2. In one or more embodiments of the invention, the IO blocks (615, 620, 630, 640) form the perimeter of the package (605). In other words, each of the IO blocks is located along a periphery of the package (605).

Still referring to FIG. 6, defective core processors are denoted with an 'X' symbol. In contrast, active core processors are denoted with a '√' symbol. As shown in FIG. 6, both the core processor 3 (660) and the core processor 4 (665) are defective. In other words, there is at least one defective core processor associated with the chip (610). Accordingly, the chip (610) is a partially functional chip.

In one or more embodiments of the invention, the design of the package (605) is essentially the same as the design of the package (305) discussed above in reference to FIG. 3. In other words, the design of the package (605), which is for the partially functioning chip (610), is essentially the same as the design of the package (305), which is for the fully functioning chip (310). As discussed above, the one or more IO blocks (615, 620, 630, 640) are used for establishing IO connections between the chip (610) and a circuit board designed for use with the chip (610). In one or more embodiments of the invention, the design of the package (605) and the design of the package (305) differ in the location and/or configuration of the one or more IO blocks.

Figure 7:
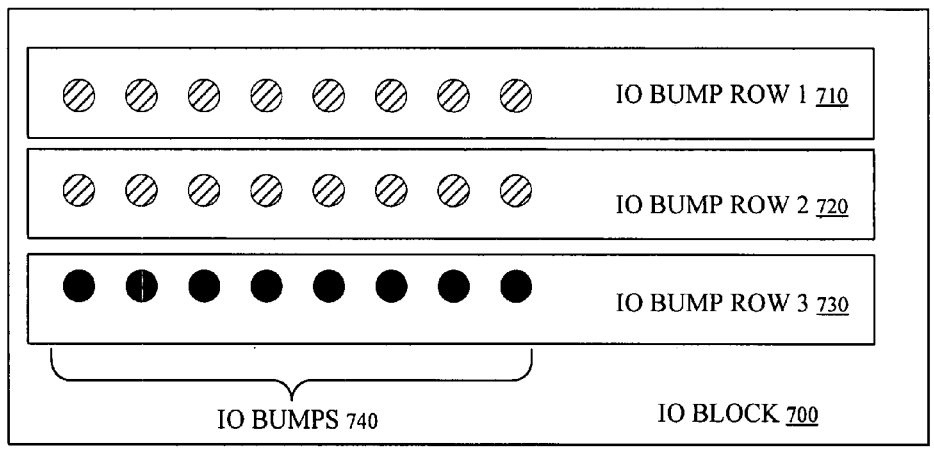
FIGS. 7 and 8 show IO blocks in accordance with one or more embodiments of the invention.

FIG. 7 shows an IO block (700) in accordance with one or more embodiments of the invention. The IO block (700) may be essentially the same as the IO blocks (615, 620, 630, 640) discussed above in reference to FIG. 6. In other words, the IO block (700) may be part of a package design for a partially functional chip. As shown in FIG. 7, the IO block (700) may include multiple IO bumps (740). The multiple IO bumps (740) may be organized in one or more rows (i.e., IO Bump Row 1 (710), IO Bump Row 2 (720), IO Bump Row 3 (730)). The IO bump row 1 (710) may be the furthest row from the outer edge of the package. Accordingly, the IO bump row 1 (710) may be referred to as an inner row. The IO bump row 3 (730) may be closest row to the outer edge of the package. Accordingly, the IO bump row 3 (730) may be referred to as an outer row.

As discussed above, the IO block (700) may be configured so each of the IO bumps (740) is mapped to a core processor in a chip. In one or more embodiments of the invention, the IO bumps (740) of the IO bump row 3 (730) are mapped to active core processors. In other words, the outer row of the IO block (700) may be mapped to active core processors of a partially functioning chip. In contrast, the IO bumps (740) of the IO bump row 1 (710) and the IO bump row 2 (720) may be mapped to the defective core processors. In other words, the inner row of the IO block (700) may be mapped to the defective core processors of a partially functioning chip. An IO bump (740) mapped to an active core processor may be referred to as an active bump. An IO bump (740) mapped to a defective processor may be referred to as an inactive bump. In one or more embodiments of the invention, an IO block is configured as shown in FIG. 7 when an aggressive bump pitch is required.

Figure 8:
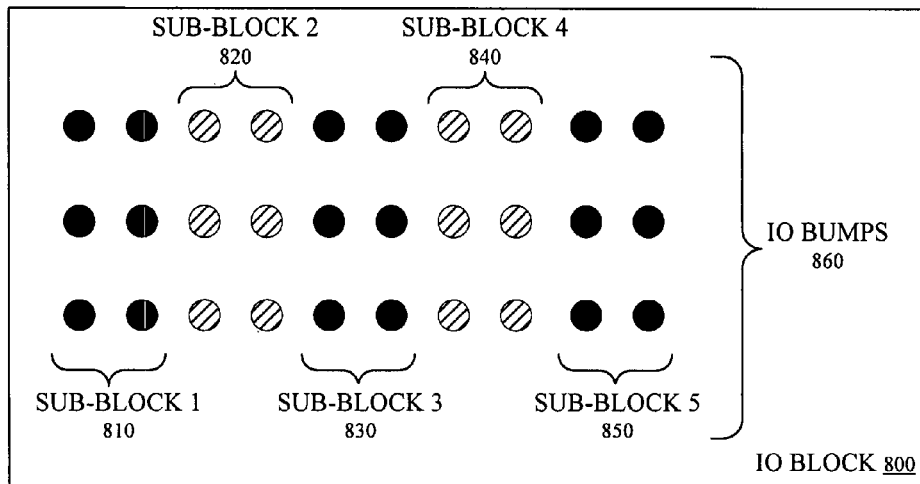

FIG. 8 shows an IO block (800) in accordance with one or more embodiments of the invention. The IO block (800) may be essentially the same as the IO blocks (615, 620, 630, 640) discussed above in reference to FIG. 6. In other words, the IO block (800) may be part of a package design for a partially functional chip. As shown in FIG. 8, the IO block (800) may include multiple IO bumps (860). The multiple IO bumps (860) may be organized in one or more sub-blocks (i.e., Sub-block 1 (810), Sub-block 2 (820), Sub-block 3 (830), Sub-block 4 (840), Sub-block 5 (850)). As shown in FIG. 8, all the IO bumps in a sub-group may be active bumps. Similarly, all the IO bumps in a sub-group may be inactive bumps.

In one or more embodiments of the invention, configuring the IO block (800) includes mapping the IO bumps (860) of every other sub-block to one or more active core processors, and mapping the remaining sub-blocks to one or more defective core processors. Accordingly, the mapping creates sub-groups of active bumps and sub-groups of inactive bumps. As a result of the mapping, every sub-group of active bumps abuts at least one sub-block of inactive bumps. Similarly, every sub-group of inactive bumps abuts at least one sub-group of active bumps. In one or more embodiments of the invention, an IO block is configured as shown in FIG. 8 when an aggressive bump pitch is not required.

Figure 9:
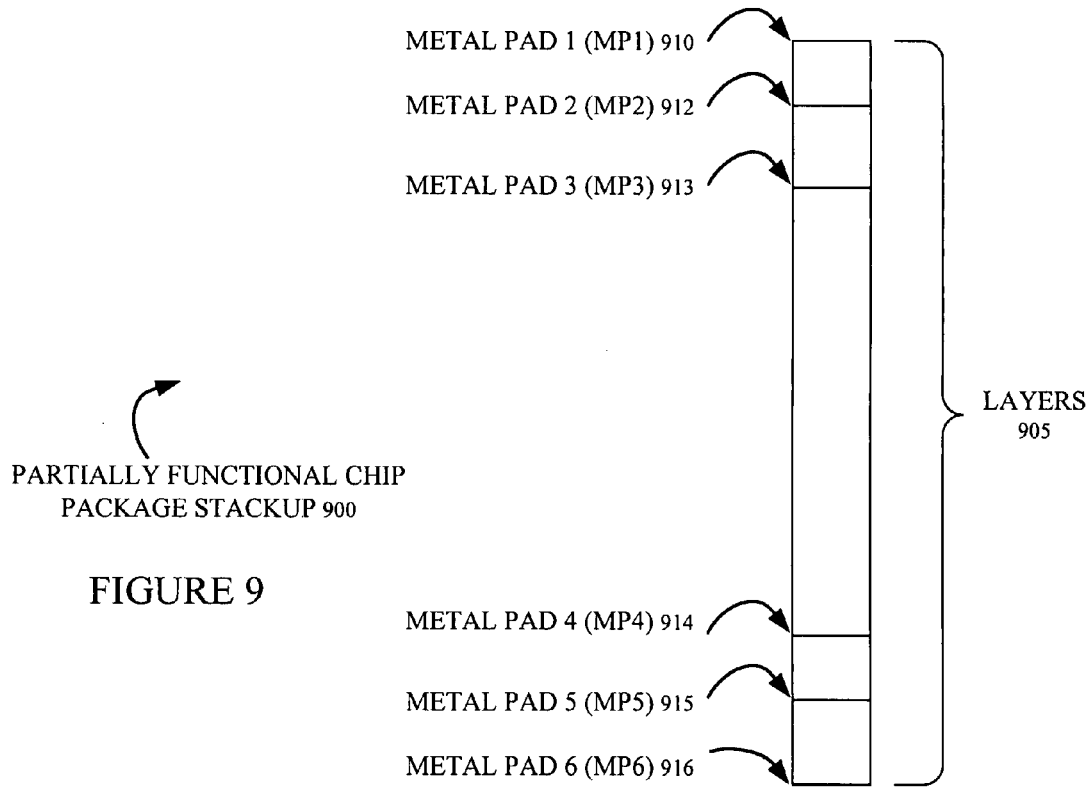
FIG. 9 shows a partially functional chip package stackup in accordance with one or more embodiments of the invention.

FIG. 9 shows a stackup (900) in the package design for a partially functional chip in accordance with one or more embodiments of the invention. The partially functional chip package stackup (900) may be the result of configuring an IO block as shown and discussed above in reference to FIG. 7 or FIG. 8. As shown in FIG. 9, the partially functional chip package stackup (900) includes multiple layers (905). The design of each layer may include a metal pad (MP) (i.e., MP1 (910), MP2 (912), MP3 (913), MP4 (914), MP5 (915), MP6 (916)). One or more of the layers (905) may be associated with power distribution (i.e., $V_{CC}$, $V_{SS}$, $V_{DD}$, VDDIO, etc.) to the core processors. In one embodiment of the invention, only one of the layers (905) is used for establishing IO connections between a core processor and the circuit board. The layer associated with MP1 (910) may be referred to as the top of the partially functional chip package stackup (900). The layer associated with MP 6 (916) may be referred to as the bottom of the stackup.

Those skilled in the art, having the benefit of this detailed description, will appreciate that the partially functional chip package stackup (900) may include fewer layers than the fully functional chip package stackup (500), discussed above in reference to FIG. 5. In one or more embodiments of the invention, the top and bottom layers of the partially functional chip package stackup (900) are essentially the same as the top and bottom layers of the fully functional chip package stackup (500), respectively. In one or more embodiments of the invention, the partially functional chip package stackup (900) is a teardown version of the fully functional chip package stackup (500).

Figure 10:
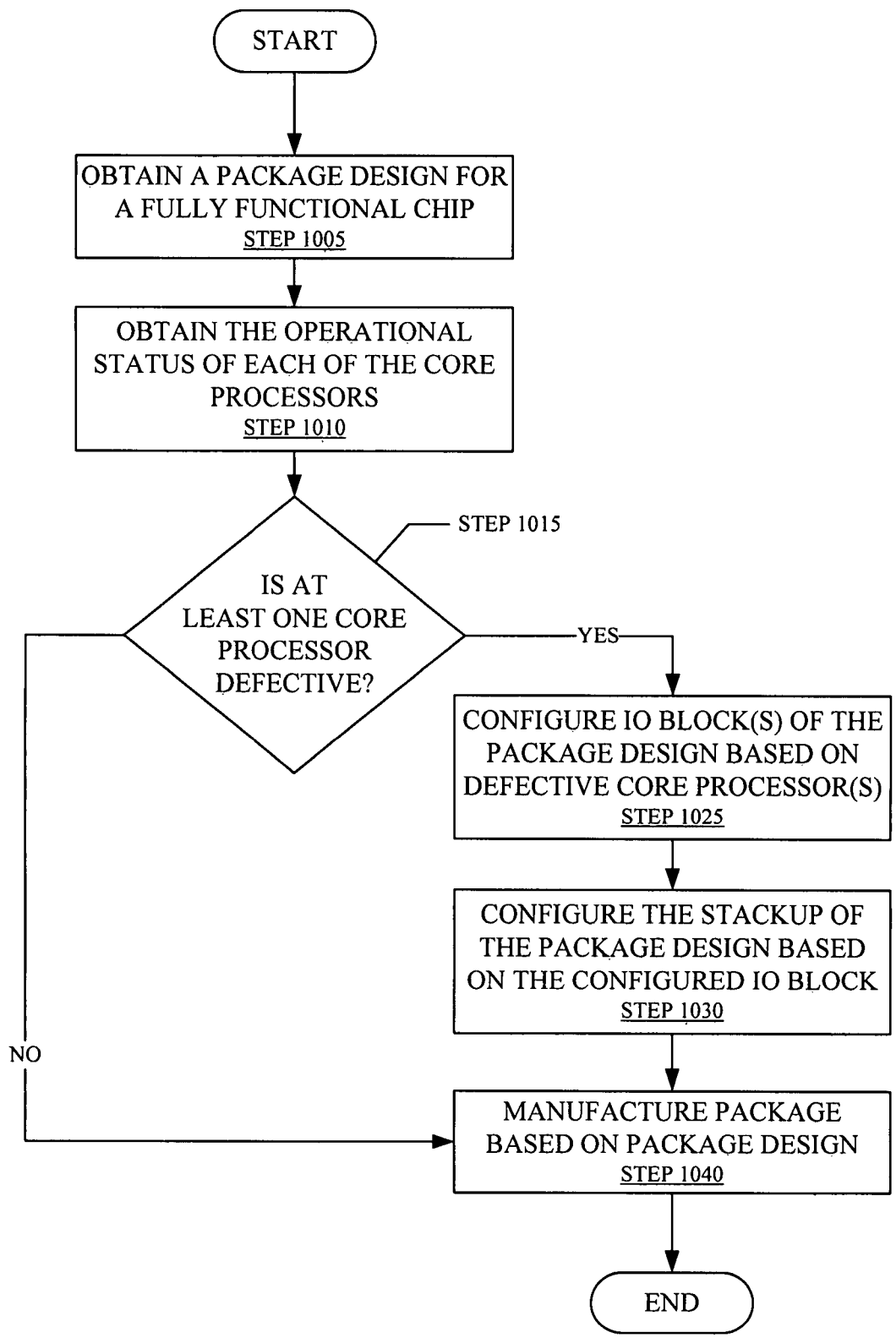
FIG. 10 shows a flowchart in accordance with one or more embodiments of the invention.

FIG. 10 shows a flowchart in accordance with one or more embodiments of the invention. The process shown in FIG. 10 may be used to design and manufacture a chip package. Initially, a package design for a fully functional chip is obtained (STEP 1005). This package design may be a pre-existing package design. As discussed above, the package design may specify many factors including the locations and/or configurations of one or more IO blocks. In one or more embodiments of the invention, the package is obtained in an electronic format (e.g., as a computer file).

In STEP 1010, the operational status of each core processor associated with the chip is obtained. In one or more embodiments of the invention, each core processor must be subjected to one or more circuit tests in order to obtain the operational status of the core processor. In one or more embodiments of the invention, once these test results exist, they are obtained in an electronic format (e.g., as a computer file).

In one or more embodiments of the invention, the manufacturing of a package takes place prior to, or in parallel with, the manufacturing of a chip.

Accordingly, it may not be known in advance which core processor(s) is active and/or which core processor(s) is defective (if any).

Still referring to STEP 1010, in one or more embodiments of the invention, the operational status of each core processor associated with the chip is obtained from an assumed scenario. The assumed scenario may dictate all the core processors are active (i.e., a fully functional chip). The assumed scenario may dictate only one of the core processors is defective (i.e., a partially functional chip). The assumed scenario may dictate only two of the core processors are active (i.e., a partially functional chip). The subsequent steps (e.g., STEP 1015, STEP 1025, STEP 1030, STEP 1040) may be repeated for each assumed scenario, resulting in multiple manufactured packages (i.e., STEP 1040).

In STEP 1015, it is determined whether at least one of the core processors is defective. In one or more embodiments of the invention, a defective core processor is identified based on obtained test results (i.e., STEP 1010). In one or more embodiments of the invention, a defective core processor is known to exist because of the assumed scenario in STEP 1010. When a determination is made that at least one of the core processors is defective (i.e., the chip is partially functional), the process proceeds to STEP 1025. When a determination is made that none of the core processors is defective (i.e., the chip is fully functional), the process proceeds to STEP 1040.

In STEP 1025, the IO blocks of the package design are configured based on the operational status of each of the core processors in the chip. In one or more embodiments of the invention, configuring the IO blocks includes strategically mapping each IO bump of the IO blocks to one of the core processors (both active and defective). In one or more embodiments of the invention, configuring the IO blocks is as described above in reference to FIG. 7 or FIG. 8.

In STEP 1030, the existing stackup of the package design is configured based on the new IO bump mapping in the IO blocks (STEP 1025). Those skilled in the art, having the benefit of this detailed description, will appreciate that configuring the stackup includes removing one or more layers of the stackup based on the strategic mapping of IO bumps in IO blocks (STEP 1025).

In STEP 1040, the package is manufactured based on the package design following the IO block configurations and the stackup configurations. Those skilled in the art, having the benefit of this detailed description, will appreciate that when the chip is fully functional, no IO block configurations and/or stackup configurations will exist because the process proceeds to STEP 1040 directly from STEP 1015.

In one or more embodiments of the invention, when multiple manufactured packages exist (discussed above in reference to STEP 1010), and the actual chip has been manufactured, the manufactured package associated with the assumed scenario that matches the actual manufactured chip is selected for use.

Those skilled in the art, having the benefit of this detailed description, will appreciate designing a package for either a fully functional chip or a partially functional chip from first principles is complex and costly. Accordingly, one or more embodiments of the invention may obtain an existing package design for a fully functional chip and apply inexpensive and simple adjustments to obtain a package design for a partially functional chip.

Those skilled in the art, having the benefit of this detailed description, will appreciate the cost of manufacturing a package is dependent, in part, on the number of layers (i.e., size of the stackup) in the package design. Accordingly, one or more embodiments of the invention reduce the number of layers in an existing stackup by strategically mapping IO bumps of IO blocks in the package design.

One or more embodiments of the invention allow increasingly more IO interconnections to be provided between a circuit board and a chip that is continually shrinking in size. One or more embodiments of the invention have the ability to more easily and less expensively apply a single existing package design to multiple chips.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions that, when executed by a processor, perform a method of designing a chip package comprising:
   obtaining a chip package design configured for a fully functional chip;
   evaluating a chip that includes a plurality of processor cores, wherein the evaluation includes obtaining an operational status of a first processor core of the plurality of processor cores;
   configuring a first IO block of the package design based on the operational status of the first processor core;
   configuring a stackup of the package design based on the configuration of the first IO block; and
   outputting a modified package design based on the stackup,
   wherein the operational status of the first processor core is defective and the chip is partially functional,
   wherein configuring the first IO block comprises:
      mapping an IO bump of an inner row of the first IO block to the first processor core; and
      mapping an IO bump of an outer row of the first IO block to a second processor core of the plurality of processor cores,
   wherein an operational status of the second processor core is active, and
   wherein the first IO block is located on a periphery of the package design.

2. A non-transitory computer readable medium comprising software instructions that, when executed by a processor, perform a method of designing a chip package comprising:
   obtaining a chip package design configured for a fully functional chip;
   evaluating a chip that includes a plurality of processor cores, wherein the evaluation includes obtaining an operational status of a first processor core of the plurality of processor cores;
   configuring a first IO block of the package design based on the operational status of the first processor core;
   configuring a stackup of the package design based on the configuration of the first IO block; and
   outputting a modified package design based on the stackup,
   wherein the operational status of the first processor core is defective and the chip is partially functional,
   wherein configuring the first IO block comprises:
      mapping a first sub-block of IO bumps to the first processor core; and
      mapping a second sub-block of IO bumps to a second processor core of the plurality of processor cores,
   wherein an operational status of the second processor core is active,
   wherein the first sub-block and the second sub-block abut within the first IO block, and
   wherein the first IO block is located on a periphery of the package design.

* * * * *